United States Patent [19]

Bro

[11] 4,110,146

[45] Aug. 29, 1978

[54] METHOD OF PRODUCING A PACKING BLANK

[75] Inventor: Niels Bro, Ballerup, Denmark

[73] Assignee: Bantex A/S, Allerod, Denmark

[21] Appl. No.: 821,578

[22] Filed: Aug. 3, 1977

[51] Int. Cl.² ............................................... B32B 7/10
[52] U.S. Cl. ...................... 156/291; 156/295; 156/306; 156/309; 428/77
[58] Field of Search ............... 156/291, 295, 306, 309; 428/77, 78, 79, 342, 507

[56] References Cited

U.S. PATENT DOCUMENTS

| 3,652,358 | 3/1972 | Strole et al. | 156/295 |
|---|---|---|---|
| 3,721,597 | 3/1973 | Colburn | 156/309 |
| 3,813,315 | 5/1974 | Yalyl | 156/309 |
| 3,868,293 | 2/1975 | Selph | 428/78 |

*Primary Examiner*—Edward G. Whitby
*Attorney, Agent, or Firm*—Silverman, Cass & Singer, Ltd.

[57] ABSTRACT

The invention concerns a method of producing a packing blank consisting of a rigid plate material, e.g. cardboard, and a cover of foil material enclosing the plate material, said cover consisting of two pieces of foil, each being glued to its respective large surface of the plate material and subsequently welded together along the edge areas protruding beyond the plate material, according to the invention, an adhesive is applied to a first foil material by being pressed out over an area corresponding to the large surface of the plate material, the plate material is placed with one of its large outer surfaces on said area, an adhesive is applied by expression to the other large, free outer surface of the plate material, and a second foil material is placed on said surface, whereupon the foil materials are welded together along the said edge areas.

2 Claims, No Drawings

METHOD OF PRODUCING A PACKING BLANK

The invention relates to a method of producing a packing blank consisting of a rigid plate material, e.g. cardboard, and a cover of foil material enclosing the plate material, said cover consisting of two pieces of foil, each being glued to its respective large surface of the plate material and subsequently welded together along edge areas protruding beyond the plate material.

According to a known method of this nature the procedure has been to apply an adhesive to both the large outer surfaces of the plate material by conveying the plate material between two cooperating application rollers, whereupon the plate material with one of its large outer surfaces is placed on a length of foil and together with same is conveyed to a place where a second length of foil is placed on the other, free outer surface of the plate material. Afterwards the two foil materials are welded together along edge areas protruding beyond the plate material, and the finished packing blank is removed by being cut off from the lengths of foil.

This method is subject to several drawbacks. Applying the adhesive by means of rollers often leads to a heterogeneous application, because the rollers are quickly worn down with the result that the foils are not uniformly glued to the outer sides of the plate material. Furthermore, transferring the glued plate material to the first length of foil is rather troublesome, because any gripping devices must be prevented from leaving marks in the coat of adhesive. Therefore, it is difficult to carry out a satisfactory transfer by means of mechanical aids.

On the other hand it is necessary that the manufacturing process be carried out with the greatest accuracy, because the adhesive must be prevented from being applied to the edge areas of the foils subsequently to be welded together. The reason is that unless weldable adhesives are used, which, however, are expensive, the adhesives normally used are not or only poorly weldable. Therefore, for reasons of accuracy it will also be inexpedient to resort to application of the adhesive by atomizing or spraying, seeing that the risk of applying adhesive to the edge areas of the foils is increased thereby, if anything.

It would not be a solution, either, entirely to omit a glueing of the foils, as this would necessitate the use of a thicker foil material, whereby the cost of material is increased.

The invention has for its object to indicate a method permitting the production technique indicated in the introduction to be carried out as a fully mechanized process without giving rise to the said drawbacks.

According to the invention this object is achieved in that an adhesive is applied to a first foil material by being pressed out over an area corresponding to the large surface of the plate material, that the plate material is placed with one of its large outer surfaces on said area, that an adhesive is applied by expression to the other large, free outer surface of the plate material, and that a second foil material is placed on said surface, whereupon the foil materials are welded together along the said edge areas.

This means that the adhesive is each time applied to a piece of material which forms the substratum of the next piece of material, whereby the process can be mechanized without mechanical transfer devices, if any, leaving marks in the coat of adhesive applied. As, furthermore, the application of adhesive is to be effected by expression, the application can with certainty be limited to a carefully predetermined area without risk of applying adhesive also to the edge areas of the foils which are subsequently to be welded together. The pressure used for the purpose of application will in each case depend on i.a. the viscosity of the adhesive, and according to the invention good results will be obtained, when the adhesive is pressed out at a pressure of max. 5 kg.

I claim:

1. A method of producing a packing blank consisting of a rigid plate material, e.g. cardboard, and a cover of foil material enclosing the plate material, said cover consisting of two pieces of foil peripherally larger than the plate material, each being glued to its respective large surface of the plate material and subsequently welded together along the edge areas protruding beyond the plate material, said method comprising the steps of extruding an adhesive onto a first foil material over an area corresponding to the large surface of the plate material, positioning the large outer surface of the plate material onto that area of said first foil carrying the adhesive, extruding an adhesive onto the other large, free outer surface of the plate material, and placing a second foil material on said free outer surface, leaving the edges free from adhesive and thereafter welding the edge areas of both foils together to enclose said plate material.

2. A method according to claim 1, characterized in that the adhesive is extruded at a maximum pressure of 5 kg.

* * * * *